Figure 1:
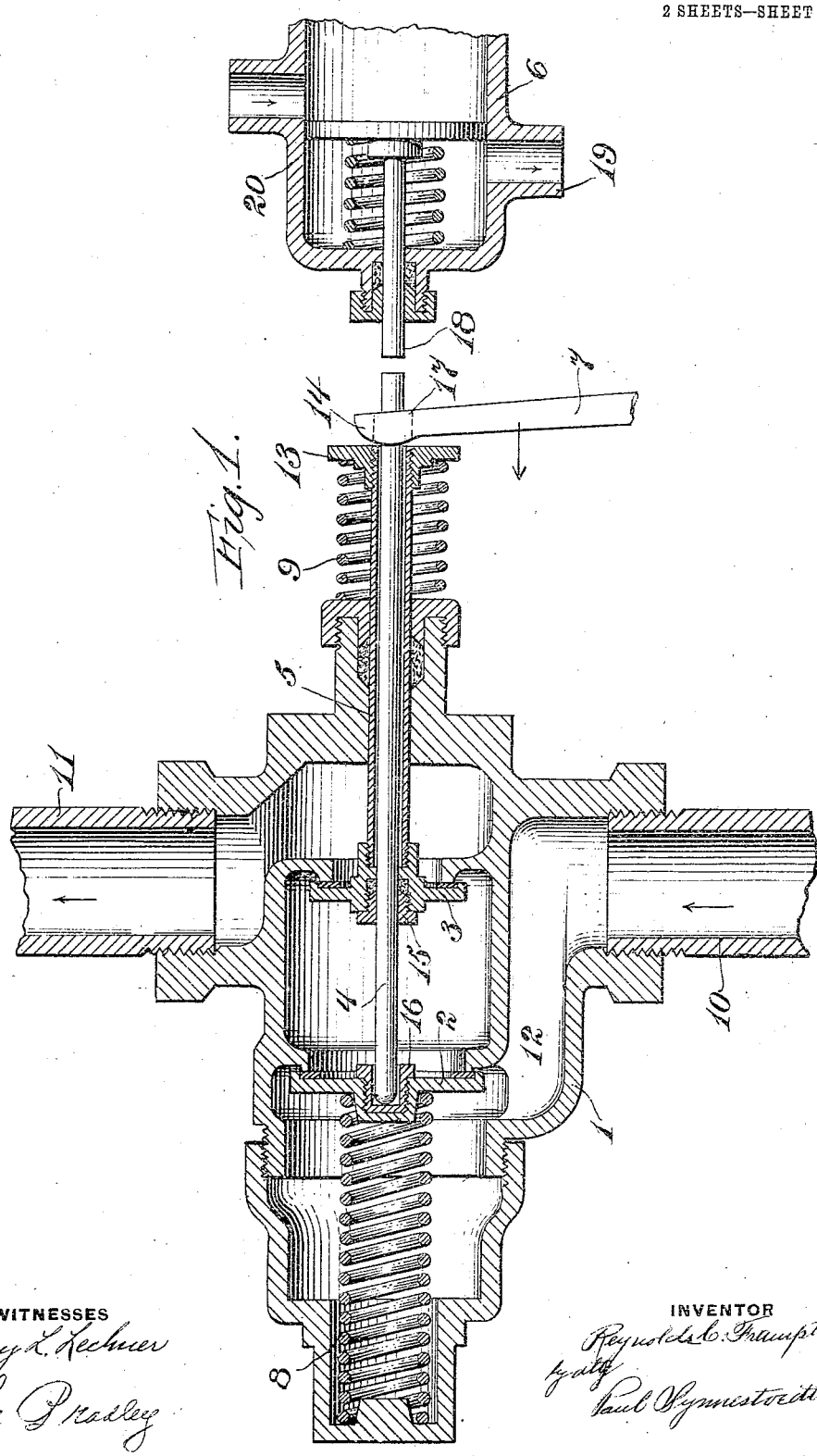

No. 868,177. PATENTED OCT. 15, 1907.
R. C. FRAMPTON.
COMBINATION VALVE.
APPLICATION FILED FEB. 11, 1907.

2 SHEETS—SHEET 1.

WITNESSES
Harvey L. Lechner
J. C. Bradley

INVENTOR
Reynolds C. Frampton
by atty
Paul Synnestvedt

No. 868,177. PATENTED OCT. 15, 1907.
R. C. FRAMPTON.
COMBINATION VALVE.
APPLICATION FILED FEB. 11, 1907.

2 SHEETS—SHEET 2.

WITNESSES
Harry L. Lechner
J. C. Bradley

INVENTOR
Reynolds C. Frampton
by atty
Paul Synnestvedt

UNITED STATES PATENT OFFICE.

REYNOLDS C. FRAMPTON, OF SWISSVALE, PENNSYLVANIA, ASSIGNOR TO PITTSBURG WATER HEATER COMPANY, OF ALLEGHENY, PENNSYLVANIA, A CORPORATION OF NEW JERSEY.

COMBINATION-VALVE.

No. 868,177.　　　Specification of Letters Patent.　　　Patented Oct. 15, 1907.

Application filed February 11, 1907. Serial No. 356,680.

*To all whom it may concern:*

Be it known that I, REYNOLDS C. FRAMPTON, a citizen of the United States, residing at Swissvale, in the county of Allegheny and State of Pennsylvania, have invented certain new and useful Improvements in Combination-Valves, of which the following is a specification.

My invention relates to combination valves, and particularly to gas valves for use in what are known as instantaneous automatic water heaters, in which it is desirable to control the flow of gas to the burners both by a thermostat regulated by the temperature of the water and by a pressure valve regulated by the flow of water. The invention has for its objects; to combine in a single valve the two independent valves heretofore used for controlling the flow of gas; to provide a combination valve of very compact form in which the two valves controlled respectively by the temperature and flow of water operate independently and without interference with each other; and finally to provide an improved combination valve of great simplicity and one which can be made at a minimum cost. These and other objects are accomplished by my invention, one form of which is illustrated in the accompanying drawings, in which, The Figure 1 is a longitudinal section through the valve, and Figure 2 is a side elevation of a heater showing the location of my improved valve and its coöperating parts.

In automatic water heaters, as now constructed, two independent gas valves are employed, the one controlled by a thermostat regulated by the heat of the water and the other controlled by the flow of water from the outlet pipe. My invention contemplates the combination of the two gas valves while retaining the dual control above referred to, and as the invention resides in the valve and not in the thermostat and the pressure controlling means, both of which are old and well known in the art, only so much of such controlling means is shown and described as is necessary to illustrate the coöperation of such parts with the combination valve in which the invention resides. The location of the valve is clearly shown in Figure 2 of the drawing, wherein A is the casing of a coil water heater, B is the improved gas valve wherein my invention particularly resides, which valve is located in the gas pipe C leading to the burners. D is the cold water inlet pipe leading to the top of the heater and provided with the usual water controlled valve E. F is the thermostat which receives the hot water from the boiler at its lower end and discharges it at its upper end, and 7 is the operating arm of the thermostat, connected by the usual levers to the lower end of the thermostat rod, and adapted to operate the stem of the valve B.

Figure 2:
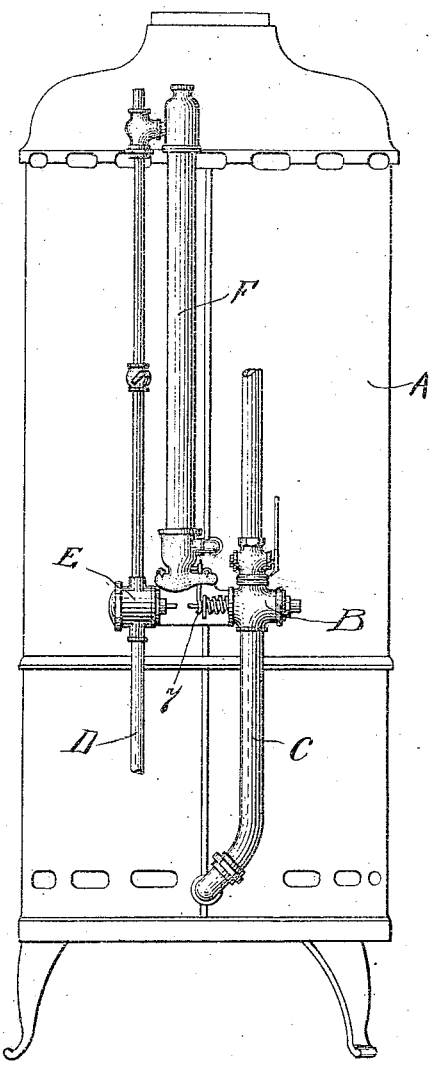

Referring to Figure 1 of the drawings, wherein my improved combination valve B is shown in detail, 1 is the casing of the valve, 2 and 3 are the two valves located in series in the passage through the casing, 4 is the operating rod for the valve 2, 5 is the operating tube for the valve 3, 6 is the casing of the valve E for controlling the rod 4 which valve is operated by the flow of water in a manner that is well known in the art, which valve is termed in the art a water valve, 7 is the operating arm for the tube 5, which arm is controlled by a thermostat connected to the heater, which thermostatic controlling means is also well known in the art, and 8 and 9 are springs for normally holding the valves 2 and 3 upon their seats. The casing 1 has an inlet 10, and outlet 11 and a connecting passage 12 in which are located the two valves 2 and 3 for giving dual control to the flow of gas through the valve. The valve 3 is carried upon the end of the tube 5, which tube carries at its outer end the collar 13 against which the curved end 14 of the operating arm 7 is adapted to bear. The valve 3 is also provided with a stuffing box 15 for securing a tight joint about the rod 4 and at the same time permitting a free movement of such rod 4 through the stuffing box. The rod 4 is rounded at its upper end as shown, and bears loosely in the thimble 16 screw threaded into the under side of the valve 2 thus permitting a more uniform seating of the valve than would be the case if the rod were rigidly connected to the valve. The rod 4 slides loosely through the tube 5 and stuffing box 15 and also through the arm 7 in which an opening 17 is provided. The rod 4 is held to the right by means of the spring 8 and is adapted to be moved to the left by means of the rod 18 on the water valve, when the outlet 19 of the water valve is opened and the piston 20 moves to the left, which operation of the water valve is old and well known in the art and need not be particularly described.

The operation is as follows, the water in the heater being hot, the outlet of the water control valve 9 being closed, and the two valves 2 and 3 being in the position shown in the drawing;—as the water in the heater cools the arm 7 gradually moves to the left thereby opening the valve 3, which opening, however, does not permit a flow of gas to the burners as the valve 2 is still tightly closed. If now the outlet 19 is opened the pressure in the water valve E will move the piston 20 to the left, causing the rod 18 to contact with the rod 4 and unseat the valve 2, thus permitting a flow of gas through the passage in the casing 1 and past the two valves 2 and 3. If the temperature of the water in the heater becomes too great, or higher than that at which the thermostat is set the thermostat acting upon the arm 7 will move it to the right thus permitting the spring 9 to close the valve 3 and shut off the supply of gas to the burners.

After the temperature of the water in the heater has been reduced by the removal of the hot water and the introduction of cold water to take its place the thermostat will again operate moving the lever arm 7 to the left and opening the valve 3 thus permitting the flow of gas to the burners.

It will be apparent from the foregoing that my combination single valve secures the same results as has heretofore been secured by the use of two separate valves, and that the independent control by the water valve and thermostat is just as positve as where two entirely independent gas valves are used. The cost of construction is also very much reduced as it will be apparent that the combination valve costs only slightly more than each of the two single valves heretofore used. Furthermore, the labor incident to repair is less with the combination valve than with the two separate valves as both valves are exposed by the removal of a single cap, and after the valve 2 has been removed the valve 3 is exposed and can be removed through the seat for the valve 2. It will also be apparent that by making the tube 5 and rod 4 telescoping a very compact and economical construction is secured.

Having thus described my invention and illustrated its use, what I claim as new and desire to secure by Letters Patent, is the following:

1. In combination in a gas valve for instantaneous heaters, a casing provided with a passage, two valves in substantial alinement in the passage and independent telescoping members for controlling the valves, the one adapted to be operated by a thermostat and the other by a water valve.

2. In combination in a gas valve for instantaneous heaters, a casing provided with a passage, two valves in substantial alinement in the passage, a tube connected to one valve and adapted to be moved by an operating means, and a rod passing through the tube to the other valve and adapted to be operated by another operating means.

In testimony whereof I have hereunto signed my name in the presence of the two subscribed witnesses.

REYNOLDS C. FRAMPTON.

Witnesses:
JAMES C. BRADLEY,
ARCHWORTH MARTIN.